(12) United States Patent
Kozar et al.

(10) Patent No.: US 10,576,683 B2
(45) Date of Patent: Mar. 3, 2020

(54) MULTI-PART FILAMENTS FOR ADDITIVE MANUFACTURING AND RELATED SYSTEMS AND METHODS

(71) Applicant: The Boeing Company, Chicago, IL (US)

(72) Inventors: Michael Patrick Kozar, Mercer Island, WA (US); Mark Stewart Wilenski, Mercer Island, WA (US); Samuel F. Harrison, Bothell, WA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 15/407,197

(22) Filed: Jan. 16, 2017

(65) Prior Publication Data

US 2018/0202080 A1 Jul. 19, 2018

(51) Int. Cl.
*B29C 64/106* (2017.01)
*B33Y 10/00* (2015.01)
*B29C 64/264* (2017.01)
*B33Y 30/00* (2015.01)
*D02G 3/44* (2006.01)
(Continued)

(52) U.S. Cl.
CPC .......... *B29C 64/106* (2017.08); *B29C 64/141* (2017.08); *B29C 64/264* (2017.08); *B29C 64/336* (2017.08); *B33Y 10/00* (2014.12); *B33Y 70/00* (2014.12); *D02G 3/447* (2013.01); *B33Y 30/00* (2014.12)

(58) Field of Classification Search
CPC .................... B29C 64/264–291; B29C 64/106
See application file for complete search history.

(56) References Cited

U.S. PATENT DOCUMENTS 3,600,272 A 8/1971 Cortigene et al.
3,813,976 A 6/1974 Greer
(Continued)

FOREIGN PATENT DOCUMENTS

CN 103817937 5/2014
DE 201310103973 10/2014
(Continued)

OTHER PUBLICATIONS

Marta Invernizzi et al., UV-Assisted 3D Printing of Glass and Carbon Fiber-Reinforced Dual-Cure Polymer Composites, Jul. 16, 2016, Materials. (Year: 2016).*
(Continued)

*Primary Examiner* — Alison L Hindenlang
*Assistant Examiner* — George W. Brady
(74) *Attorney, Agent, or Firm* — Dascenzo Intellectual Property Law, P.C.

(57) ABSTRACT

Multi-part filaments for additive manufacturing comprise an elongate filament body. The elongate filament body comprises a first body part extending longitudinally along the elongate filament body, and a second body part extending longitudinally along the elongate filament body. The first body part comprises a first material, and the second body part comprises a second material. One of the first body part and the second body part is more rigid than the other of the first body part and the second body part and is sufficiently rigid to print self-supporting structures from the multi-part filament.

18 Claims, 4 Drawing Sheets

(51) Int. Cl.
  *B29C 64/336* (2017.01)
  *B33Y 70/00* (2020.01)
  *B29C 64/141* (2017.01)

(56) References Cited

U.S. PATENT DOCUMENTS

| | | | |
|---|---|---|---|
| 4,154,634 | A | 5/1979 | Shobert et al. |
| 4,378,343 | A | 3/1983 | Sugiura et al. |
| 4,435,246 | A | 3/1984 | Green |
| 4,943,472 | A | 7/1990 | Dyksterhouse et al. |
| 5,204,124 | A | 4/1993 | Secretan et al. |
| 5,294,461 | A | 3/1994 | Ishida |
| 5,340,433 | A | 8/1994 | Crump |
| 5,398,193 | A | 3/1995 | deAngelis |
| 5,495,328 | A | 2/1996 | Spence et al. |
| 5,936,861 | A | 8/1999 | Jang et al. |
| 6,129,872 | A | 10/2000 | Jang |
| 6,149,856 | A | 11/2000 | Zemel et al. |
| 6,214,279 | B1 | 4/2001 | Yang et al. |
| 6,362,388 | B1 | 3/2002 | Lucas |
| 6,395,210 | B1 | 5/2002 | Head et al. |
| 6,500,370 | B1* | 12/2002 | Belvin ............... B29C 70/16 156/180 |
| 6,722,872 | B1 | 4/2004 | Swanson et al. |
| 7,114,943 | B1 | 10/2006 | Fong et al. |
| 8,133,537 | B2 | 3/2012 | Nair et al. |
| 8,151,854 | B2 | 4/2012 | Oldani |
| 8,801,990 | B2 | 8/2014 | Mikulak et al. |
| 8,920,697 | B2 | 12/2014 | Mikulak et al. |
| 9,149,989 | B2 | 10/2015 | Uckelmann |
| 9,511,543 | B2 | 12/2016 | Tyler |
| 10,059,056 | B2* | 8/2018 | Church ............... B29C 64/106 |
| 10,112,380 | B2* | 10/2018 | Evans ............... B29C 69/001 |
| 2003/0044593 | A1 | 3/2003 | Vaidyanathan et al. |
| 2004/0119188 | A1 | 6/2004 | Lowe |
| 2005/0023719 | A1 | 2/2005 | Nielsen et al. |
| 2005/0038222 | A1 | 2/2005 | Joshi et al. |
| 2005/0104241 | A1 | 5/2005 | Kritchman et al. |
| 2005/0116391 | A1 | 6/2005 | Lindemann et al. |
| 2005/0248065 | A1 | 11/2005 | Owada |
| 2007/0029030 | A1 | 2/2007 | McCowin |
| 2008/0213419 | A1 | 9/2008 | Skubic et al. |
| 2008/0315462 | A1 | 12/2008 | Batzinger et al. |
| 2009/0130449 | A1 | 5/2009 | El-Siblani |
| 2009/0314391 | A1 | 12/2009 | Crump et al. |
| 2010/0024964 | A1 | 2/2010 | Ingram, Jr. et al. |
| 2010/0084087 | A1 | 4/2010 | McCowin et al. |
| 2010/0190005 | A1 | 7/2010 | Nair et al. |
| 2011/0147993 | A1 | 6/2011 | Eshed et al. |
| 2011/0300301 | A1 | 12/2011 | Fernando et al. |
| 2014/0086780 | A1 | 3/2014 | Miller et al. |
| 2014/0154347 | A1 | 6/2014 | Dilworth et al. |
| 2014/0263534 | A1 | 9/2014 | Post et al. |
| 2014/0265000 | A1 | 9/2014 | Magnotta et al. |
| 2014/0265040 | A1 | 9/2014 | Batchelder |
| 2014/0291886 | A1* | 10/2014 | Mark ............... B29C 64/118 264/163 |
| 2014/0328964 | A1 | 11/2014 | Mark et al. |
| 2014/0375794 | A1 | 12/2014 | Singh |
| 2015/0008422 | A1 | 1/2015 | Lee et al. |
| 2015/0037599 | A1 | 2/2015 | Blackmore |
| 2015/0044377 | A1 | 2/2015 | Tibor et al. |
| 2015/0048553 | A1 | 2/2015 | Dietrich et al. |
| 2015/0136455 | A1* | 5/2015 | Fleming ............... B29C 64/106 174/255 |
| 2015/0140230 | A1 | 5/2015 | Jones et al. |
| 2015/0165691 | A1 | 6/2015 | Mark et al. |
| 2015/0174824 | A1 | 6/2015 | Gifford et al. |
| 2015/0201500 | A1* | 7/2015 | Shinar ............... H05K 3/125 425/132 |
| 2015/0217517 | A1* | 8/2015 | Karpas ............... B33Y 30/00 264/464 |
| 2015/0266243 | A1 | 9/2015 | Mark et al. |
| 2015/0291833 | A1 | 10/2015 | Kunc et al. |
| 2016/0136897 | A1 | 5/2016 | Nielsen-Cole et al. |
| 2016/0159009 | A1* | 6/2016 | Canale ............... B33Y 10/00 264/401 |
| 2016/0303793 | A1 | 10/2016 | Ermoshkin et al. |
| 2016/0332363 | A1 | 11/2016 | Moore et al. |
| 2017/0008235 | A1* | 1/2017 | Tyler ............... B29C 64/209 |
| 2017/0129180 | A1 | 5/2017 | Coates et al. |
| 2017/0174932 | A1* | 6/2017 | Granlund ............... B29C 64/118 |
| 2017/0251713 | A1* | 9/2017 | Warner ............... B29C 64/106 |
| 2017/0259502 | A1* | 9/2017 | Chapiro ............... B33Y 10/00 |
| 2017/0341300 | A1* | 11/2017 | Rudolph ............... B29C 64/386 |
| 2018/0029291 | A1* | 2/2018 | Matzner ............... B33Y 70/00 |
| 2018/0186076 | A1* | 7/2018 | Backer ............... C08L 83/04 |
| 2018/0272599 | A1* | 9/2018 | Rodriguez ............... B29C 64/106 |

FOREIGN PATENT DOCUMENTS

| | | | |
|---|---|---|---|
| DE | 102015002967 | | 10/2016 |
| EP | 1151849 | | 11/2001 |
| JP | 2015174284 | | 10/2015 |
| WO | WO 2006/020685 | | 2/2006 |
| WO | WO 2012/039956 | | 3/2012 |
| WO | WO 2013/086577 | | 6/2013 |
| WO | WO 2014/153535 | | 9/2014 |
| WO | WO 2015/009938 | | 1/2015 |
| WO | WO-2015077262 | A1 * | 5/2015 ........... B29C 64/106 |
| WO | WO2015193819 | | 12/2015 |
| WO | WO 2016/053681 | | 4/2016 |
| WO | WO 2016125138 | | 8/2016 |
| WO | WO 2016139059 | | 9/2016 |
| WO | WO2016149181 | | 9/2016 |

OTHER PUBLICATIONS

Ahmed et al., "Comparisons of Bending Stiffness of 3d Printed Samples of Different Materials", 2014 (Year: 2014).*
U.S. Appl. No. 15/367,021, filed Dec. 1, 2016, Wilenski et al.
U.S. Appl. No. 15/356,420, filed Nov. 18, 2016, Wilenski et al.
U.S. Appl. No. 15/346,537, filed Nov. 8, 2016, Wilenski et al.
U.S. Appl. No. 15/345,189, filed Nov. 7, 2016, Wilenski et al.
U.S. Appl. No. 15/087,882, filed Mar. 31, 2016, Harrison et al.
U.S. Appl. No. 15/063,400, filed Mar. 7, 2016, Evans et al.
U.S. Appl. No. 14/995,507, filed Jan. 14, 2016, Evans et al.
U.S. Appl. No. 14/931,573, filed Nov. 3, 2015, Evans et al.
U.S. Appl. No. 14/920,748, filed Oct. 22, 2015, Evans et al.
Website screenshots showing Stratonics ThermaViz® Sensor Systems, from Stratonics.com website, downloaded on Nov. 4, 2016.
Printout of online article, "Improving Additive Manufacturing (3D Printing) using Infrared Imaging," Aug. 10, 2016, from AZoM.com website, downloaded on Nov. 4, 2016.
Printout of online article, Jeff Sloan, "Arevo Labs launches 3D printing platform for composite parts fabrication," Nov. 16, 2015, from CompositesWorld.com website, downloaded on Dec. 9, 2015.
U.S. Appl. No. 14/841,470, filed Aug. 31, 2015, Evans et al.
U.S. Appl. No. 14/841,423, filed Aug. 31, 2015, Evans et al.
Website screenshots of online article, Evan Milberg, "Arevo Labs Introduces First Robot-Based Platform for 3-D Printing Composite Parts," Nov. 23, 2015, from CompositesManufacturingMagazine.com website, downloaded on Jan. 12, 2016.
Website screenshots of online how-to article, "Fiber Composite 3D Printing (The Bug)," from Instructables.com website, downloaded on Aug. 20, 2015.
Website screenshots showing The Form 1+ SLA 3D Printer, from FormLabs.com website, downloaded on Aug. 20, 2015.
Printout of website showing FormLabs, Frequently Asked Questions (re the Form1+ SLA 3D Printer), from FormLabs.com website, downloaded on Aug. 19, 2015.
Printout of online article "Carbon3D Introduces Breakthrough CLIP Technology for Layerless 3D Printing, 25-100x Faster," Mar. 17, 2015, from 3Ders.org website, downloaded on Aug. 19, 2015.
Website screenshots showing online article, Krassenstein "Orbital Composites to Make 3D Printing 100 Times Faster Using Carbon Fiber, Fiber Optics, Injection & More," Apr. 28, 2015, from 3DPrint.com website, downloaded on Aug. 19, 2015.

(56) References Cited

OTHER PUBLICATIONS

Printout of online article "Carbon-Fiber Epoxy Honeycombs Mimic the Material Performance of Balsa Wood," Jun. 27, 2014, downloaded from redorbit.com/news/science/1113180114/carbon-fiber-epoxy-honeycombs-mimic-the-material-performance-of-balsa-wood/, Aug. 19, 2015.
Website screenshots showing The Mark One Composite 3D Printer, from MarkForged.com website, downloaded on Aug. 19, 2015.
Website screenshots showing abstract of Debout et al., "Tool Path Smoothing of a Redundant Machine: Application to Automated Fiber Placement," Computer-Aided Design, vol. 43, Issue 2, pp. 122-132, Feb. 2011, from ScienceDirect.com website, downloaded on Aug. 19, 2015.
Printout of online article "Automated Fiber Placement," from AutomatedDynamics.com website, downloaded on Aug. 19, 2015.
User Manual for 3Doodler 2.0, from The3Doodler.com website, downloaded on Aug. 19, 2015.
Farshidianfar et al., "Real-Time Control of Microstructure in Laser Assitive Manufacturing," International Journal of Advanced Manufacturing Technology (2016), vol. 82, pp. 1173-1186, published online Jul. 1, 2015.
Website screenshots showing "Fiber Composite 3D Printing," from MakeZine.com website, downloaded on Jun. 2, 2015.
Hu et al., "Sensing, Modeling and Control for Laser-Based Additive Manufacturing," International Journal of Machine Tools and Manufacture, No. 43, pp. 51-60, 2003.
Gupta et al., "Dual Curing of Carbon Fiber Reinforced Photoresins for Rapid Prototyping," Polymer Composites, vol. 23, No. 6, pp. 1162-1170, Dec. 2002.
Renault et al., "Photo Dynamic Mechanical Analysis for Cure Monitoring of Fiber Reinforced Photoresin Composites," Journal of Advanced Materials, vol. 29, No. 1, pp. 42-47, Oct. 12, 1996.
Ogale et al., "3-Dimensional Composite Photolithography," Proceedings of the American Society for Composites, Eleventh Technical Conference, pp. 822-828, Oct. 7-9, 1996.
Ogale et al., "Fabrication of Fiber Reinforced Plates with Curvilinear Layout by 3-D Photolithography," $26^{th}$ International SAMPE Technical Conference, vol. 26, pp. 54-61, Oct. 17-20, 1994.
Machine generated English translation of the abstract of JP2015174284, downloaded from Espacenet.com Jun. 12, 2018.
Machine generated English translation of the abstract of DE102015002967, downloaded from Espacenet.com Jun. 12, 2018.
Machine generated English translation of CN 103817937, dated Mar. 26, 2018.
Machine generated English translation of abstract for DE 201310103973 downloaded from Espacenet.com on Nov. 1, 2017.

\* cited by examiner

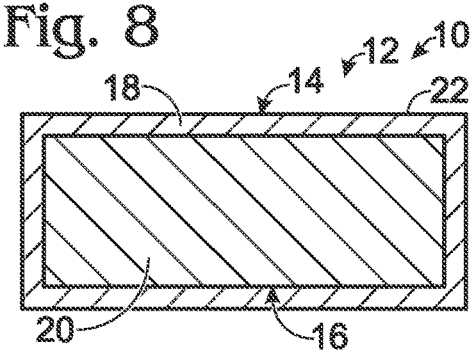
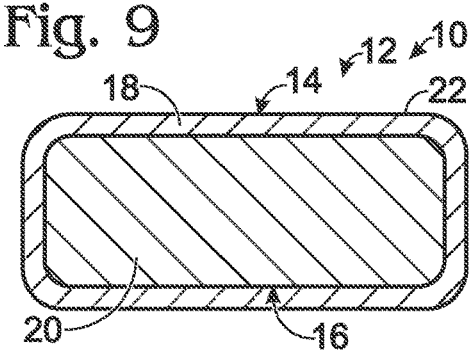
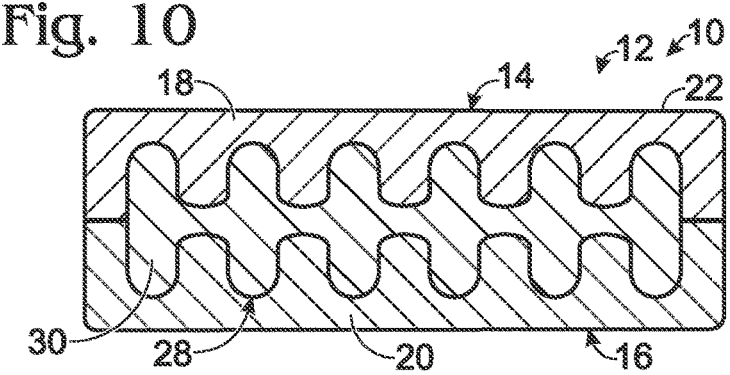
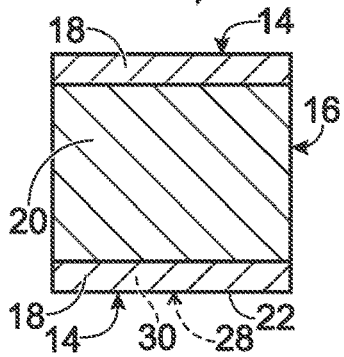
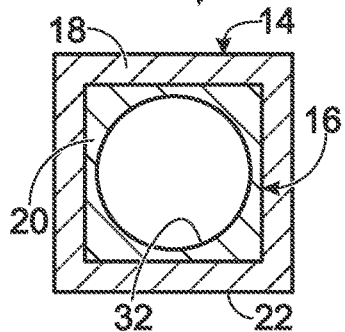
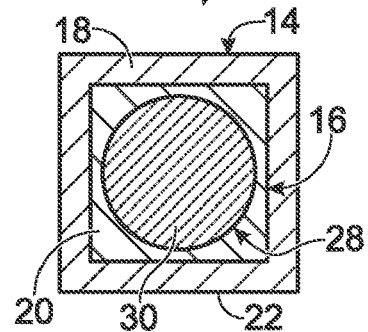
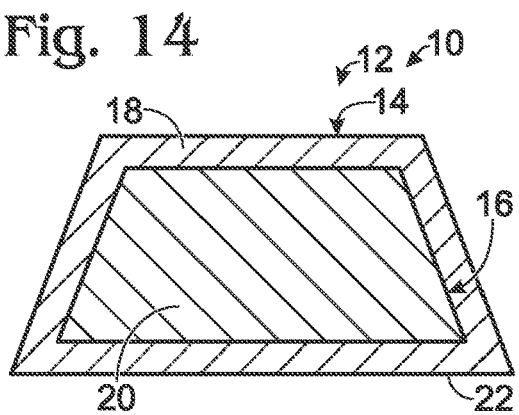
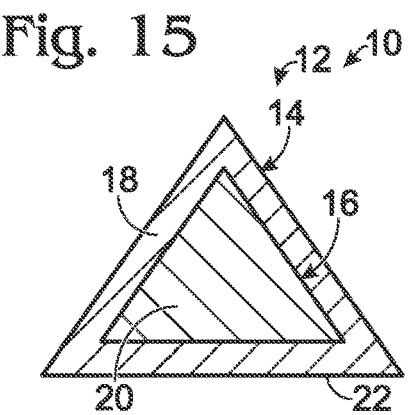

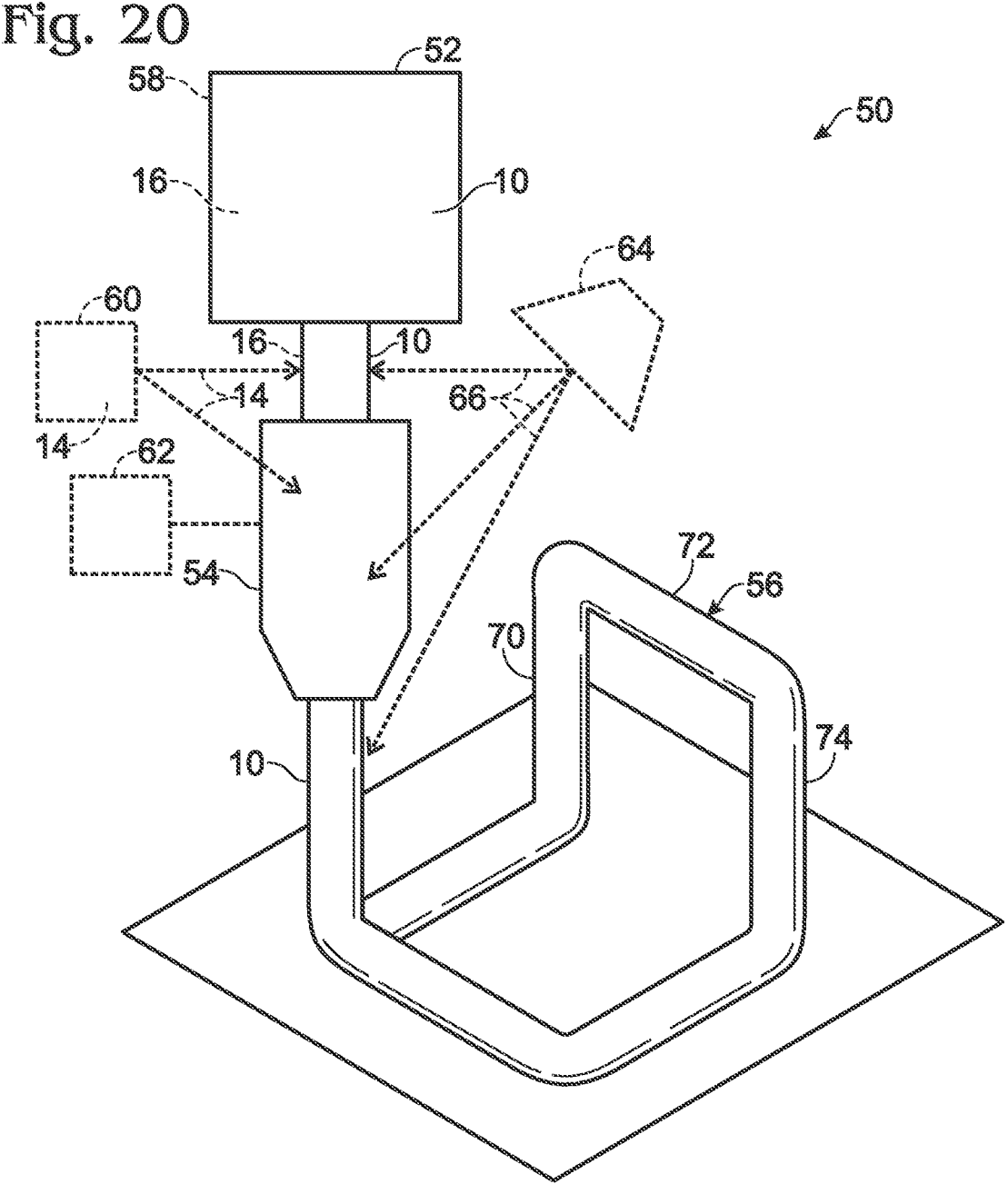

MULTI-PART FILAMENTS FOR ADDITIVE MANUFACTURING AND RELATED SYSTEMS AND METHODS

FIELD

The present disclosure relates to fused filament fabrication.

BACKGROUND

Fused filament fabrication is a 3D printing process that uses a continuous filament of material, typically a thermoplastic that is dispensed, or extruded, from a print head that moves in three dimensions under computer control to manufacture a part. Current fused filament fabrication machines "print" parts by sequentially stacking two-dimensional layers on top of each other. This stacking, or layering, of layers limits the complexity of parts that can be manufactured by such machines.

SUMMARY

Multi-part filaments for additive manufacturing and related systems and methods are disclosed.

Multi-part filaments comprise an elongate filament body. The elongate filament body comprises a first body part extending longitudinally along the elongate filament body and a second body part extending longitudinally along the elongate filament body. The first body part comprises a first material, and the second body part comprises a second material. In some examples, one of the first body part and the second body part is more rigid than the other of the first body part and the second body part and is sufficiently rigid to print self-supporting structures from the multi-part filament.

Some methods comprise forming a multi-part filament. In some such methods, the forming comprises applying the second body part to the first body part.

Methods of additively manufacturing a part comprise dispensing a multi-part filament in three dimensions to additively manufacture the part. In some such methods, the dispensing comprises dispensing the multi-part filament without a substrate against which the multi-part filament is laterally supported.

Some systems for additively manufacturing a part comprise a supply of a multi-part filament and a delivery guide positioned to receive the multi-part filament from the supply and configured to dispense the multi-part filament to additively manufacture the part.

Some systems for additively manufacturing a part comprise a supply of a first body part, a supply of a second body part, and a delivery guide. The supply of the first body part is positioned relative to the supply of the second body part and is configured to apply the first body part to the second body part to form a multi-part filament. The delivery guide is positioned relative to the supply of the second body part and the supply of the first body part and is configured to dispense the multi-part filament to additively manufacture the part.

BRIEF DESCRIPTION OF THE DRAWINGS

FIG. 8 is a cross-sectional view of another example of a multi-part filament for additive manufacturing.

FIG. 9 is a cross-sectional view of another example of a multi-part filament for additive manufacturing.

FIG. 10 is a cross-sectional view of another example of a multi-part filament for additive manufacturing.

FIG. 11 is a cross-sectional view of another example of a multi-part filament for additive manufacturing.

FIG. 12 is a cross-sectional view of another example of a multi-part filament for additive manufacturing.

FIG. 13 is a cross-sectional view of another example of a multi-part filament for additive manufacturing.

FIG. 14 is a cross-sectional view of another example of a multi-part filament for additive manufacturing.

FIG. 15 is a cross-sectional view of another example of a multi-part filament for additive manufacturing.

FIG. 20 is a schematic illustration representing systems for additive manufacturing that utilize multi-part filaments.

DESCRIPTION

Multi-part filaments for additive manufacturing and related systems and methods are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
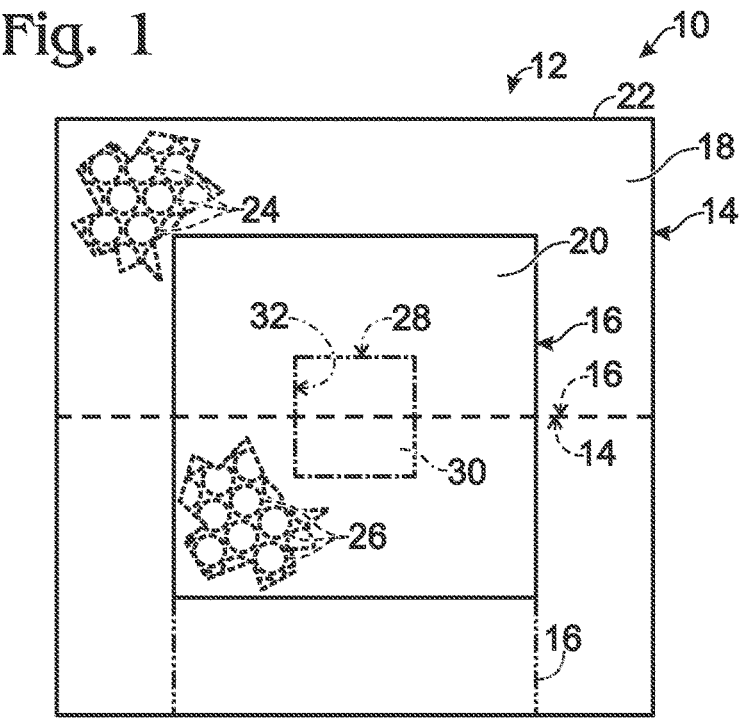
FIG. 1 is a schematic cross-sectional diagram representing multi-part filaments for additive manufacturing.
Figure 2:
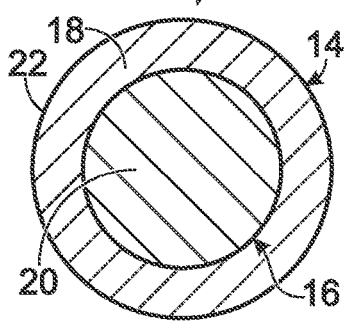
FIG. 2 is a cross-sectional view of an example of a multi-part filament for additive manufacturing.
Figure 3:
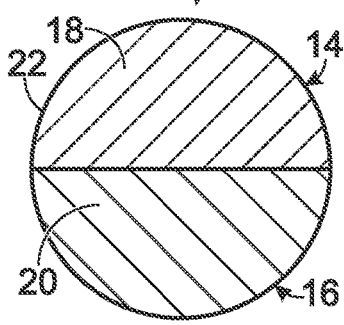
FIG. 3 is a cross-sectional view of another example of a multi-part filament for additive manufacturing.
Figure 4:
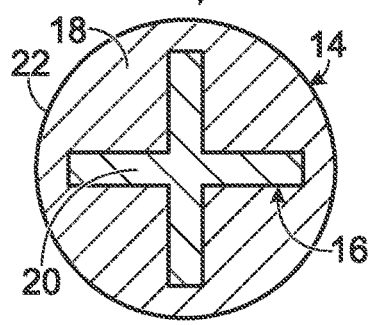
FIG. 4 is a cross-sectional view of another example of a multi-part filament for additive manufacturing.
Figure 5:
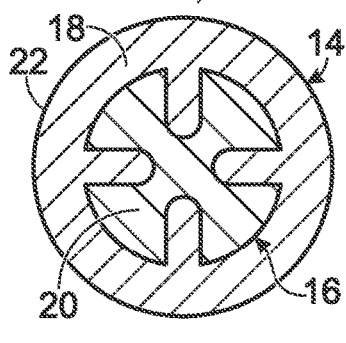
FIG. 5 is a cross-sectional view of another example of a multi-part filament for additive manufacturing.
Figure 6:
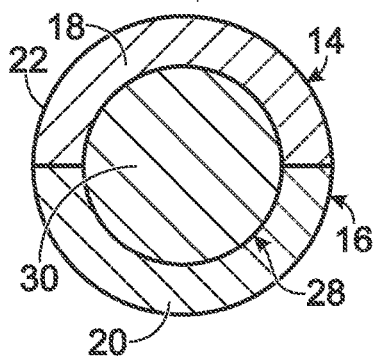
FIG. 6 is a cross-sectional view of another example of a multi-part filament for additive manufacturing.
Figure 7:
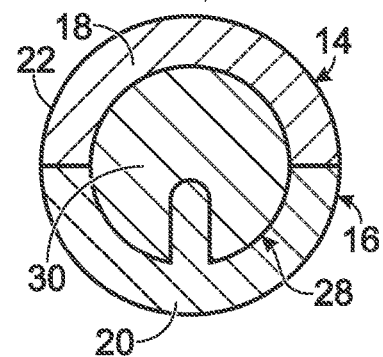
FIG. 7 is a cross-sectional view of another example of a multi-part filament for additive manufacturing.
Figure 16:
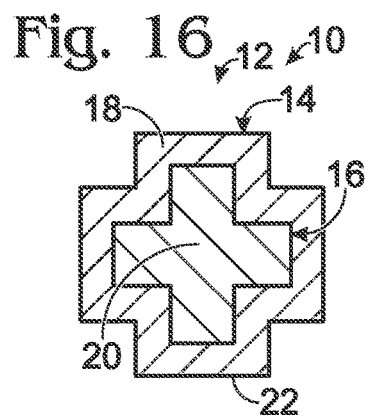
FIG. 16 is a cross-sectional view of another example of a multi-part filament for additive manufacturing.
Figure 17:
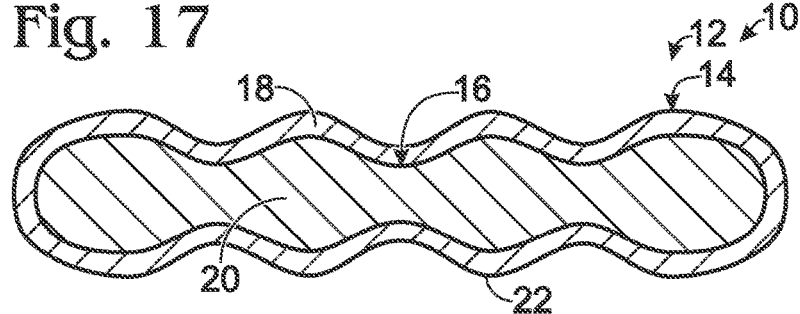
FIG. 17 is a cross-sectional view of another example of a multi-part filament for additive manufacturing.

As schematically illustrated in FIG. 1 in cross-section, multi-part filaments 10 for additive manufacturing comprise an elongate body 12. The elongate body 12 of a multi-part filament 10 typically, or at least in its initially manufactured form, has a length that is significantly greater than its diameter, or cross-sectional, lateral dimension. As illustrative, non-exclusive examples, the elongate body 12 may have a length that is at least 10, at least 100, at least 1000, at least 10000, at least 100000, or at least 1000000 times greater than its diameter, or cross-sectional, lateral dimension. Accordingly, multi-part filaments 10 are configured for use as the feedstock, or at least as a component of the feedstock, for an additive manufacturing system, such as may be referred to as a fused filament fabrication (FFF) system.

As schematically represented in FIG. 1, the elongate filament body 12 comprises at least a first body part 14 and a second body part 16, both extending longitudinally along the elongate filament body 12. The first body part 14 comprises a first material 18, and the second body part 16 comprises a second material 20. In FIG. 1, the first body part 14 and the second body part 16 are schematically represented in solid lines in a coaxial arrangement with the first body part 14 surrounding the second body part 16 and with the first body part defining an external surface 22 of the elongate filament body 12. However, other arrangements also are within the scope of multi-part filaments 10 according to the present disclosure, with FIG. 1 further schematically representing various such arrangements. For example, as indicated by the dash-dot-dot lines in FIG. 1, the second body part 16 may not be completely surrounded by the first body part 14, such that the first body part 14 and the second body part 16 collectively define the external surface 22 of the elongate filament body 12. In such an example, the second body part 16 may be described as being partially surrounded by the first body part 14. Additionally or alternatively and as schematically represented by the horizontal dashed line in FIG. 1, the first body part 14 and the second body part 16 may be laterally positioned with respect to each other without the first body part 14 surrounding or partially surrounding the second body part 16.

In some examples of multi-part filament 10, the first body part 14 is more rigid than the second body part 16 or the second body part 16 is more rigid than the first body part 14. In some such examples, one of the first body part 14 and the second body part 16 may be described as being sufficiently rigid to print self-supporting structures from the multi-part filament 10. Stated differently, one of the first body part 14 and the second body part 16 may provide sufficient rigidity to the multi-part filament 10 such that the multi-part filament 10 may be dispensed for additively manufacturing a part in three dimensions without a substrate against which the multi-part filament 10 is laterally supported. That is, the multi-part filament 10 may be sufficiently rigid that it generally remains where dispensed even if not dispensed directly against itself or other substrate that engages a lateral side (i.e., the external surface 22) of the multi-part filament. In other words, to be self-supporting, the multi-part filament 10 must be able to hold shear when being dispensed into a given length of the multi-part filament 10. For example, with reference to FIG. 20, lengths 70, 72, and 74 of multi-part filament 10 may be described as being self-supported and without a substrate against which the lengths 70, 72, and 74 are laterally supported.

The sufficiency of rigidity of the multi-part filament 10, such that it may be dispensed in a self-supporting length, may be a function of one or more of (i) the size of the multi-part filament, (ii) the cross-sectional shape of the multi-part filament 10, (iii) the largest dimension of a perpendicular cross-section of the multi-part filament 10, (iv) the smallest dimension of a perpendicular cross-section of the multi-part filament 10, (v) the elastic modulus of one or more of the multi-part filament 10, the first body part 14, and the second body part 16, (vi) the area moment of inertia of one or more of the multi-part filament 10, the first body part 14, and the second body part 16, (vii) material properties of the multi-part filament 10, (viii) material properties of the first body part 14, (ix) material properties of the second body part 16, (x) material properties of a third body part 28, (xi) the presence of a void 32, (xii) the unsupported distance to be spanned by a length of self-supporting multi-part filament 10 as it is being dispensed, (xiii) the orientation in three-dimensional space of a length of self-supporting multi-part filament 10 as it is being dispensed, (xiv) the inclusion and configuration of fibers 24 and/or fibers 26 in multi-part filament 10, (xv) the rate of dispensing of the multi-part filament 10, (xvi) the rate of temperature change of the multi-part filament following being dispensed, (xvii) the rate of cure of one or more of the multi-part filament 10, the first body part 14, and the second body part 16, (xviii) the rate of modulus development of one or more of the multi-part filament 10, the first body part 14, and the second body part 16, (xix) the thermal conductivity of one or more of the multi-part filament 10, the first body part 14, and the second body part 16, and (xx) the heat capacity of one or more of the multi-part filament 10, the first body part 14, and the second body part 16.

As illustrative, non-exclusive examples, one of the first body part 14 and the second body part 16 may have a Young's modulus of at least 10 MPa, at least 100 MPa, at least 1000 MPa, or at least 10000 MPa. In some examples, the other of the first body part 14 and the second body part 16 may have a Young's modulus that is less than 10 MPa, less than 100 MPa, less than 1000 MPa, or less than 10000 MPa.

Additionally or alternatively, in some examples, one of the first body part 14 and the second body part 16 may have a flexural rigidity (i.e., Young's Modulus (E) times second moment of inertia (I)) of at least $10^{-9}$ Nm$^2$, at least $10^{-8}$ Nm$^2$, at least $10^{-7}$ Nm$^2$, at least $10^{-6}$ Nm$^2$, at least $10^{-8}$ Nm$^2$, at least $10^{-4}$ Nm$^2$, at least $10^{-3}$ Nm$^2$, at least $10^{-2}$ Nm$^2$, or at least $10^{-1}$ Nm$^2$. In some examples, the other of the first body part 14 and the second body 16 may have a flexural rigidity that is less than $10^{-9}$ Nm$^2$, less than $10^{-8}$ Nm$^2$, less than $10^{-7}$ Nm$^2$, less than $10^{-6}$ Nm$^2$, less than $10^{-5}$ Nm$^2$, less than $10^{-4}$ Nm$^2$, less than $10^{-3}$ Nm$^2$, less than $10^{-2}$ Nm$^2$, less than least $10^{-1}$ Nm$^2$. In some examples of multi-part filaments 10, the first material 18 is a curable material. In some such examples, the second material 20 is a non-curable material. In other such examples, the second material 20 is also a curable material. Alternatively, in some examples, the second material 20 is a curable material and the first material is a non-curable material. In yet other examples, both the first material 18 and the second material 20 may be non-curable materials.

As used herein, a "curable material" is a material that is configured to be hardened as a result of cross-linking of polymer chains, such as responsive to an application of curing energy. Such curing energy may comprise one or more of heat, ultraviolet light, visible light, infrared light, x-rays, electron beams, and microwaves, for example, and curable materials may take the form of one or more of a polymer, a resin, a thermoplastic, a thermoset, a photopolymer, an ultra-violet photopolymer, a visible-light photopolymer, an infrared-light photopolymer, and an x-ray photopolymer. As used herein, a photopolymer is a polymer that is configured to be cured in the presence of light, such as one or more of ultra-violet light, visible-light, infrared-light, and x-rays. Conversely, a "non-curable" material is a material that is not a curable material.

In some examples of multi-part filaments 10 in which both the first material 18 and the second material 20 are curable materials, the first material 18 may be different from the second material 20. In other words, the first material 18 may have cure properties that are different from the second material 20. Stated differently, in some examples, the first material 18 is configured to be cured responsive to a first cure condition, and the second material 20 is configured to be cured responsive to a second cure condition that is different from the first cure condition.

For example, the first cure condition may comprise, or require, a higher dose of curing energy or a lower dose of curing energy than the second cure condition for a desired cure to be achieved for the respective material. Additionally or alternatively, the first cure condition may comprise, or require, a higher dose rate of curing energy or a lower dose rate of curing energy than the second cure condition for a desired cure to be achieved for the respective material. Additionally or alternatively, the first cure condition may comprise, or require, a higher temperature or a lower temperature than the second cure condition for a desired cure to be achieved for the respective material. Additionally or alternatively, the first cure condition may comprise, or require, a higher moisture or a lower moisture than the second cure condition for a desired cure to be achieved for the respective material. Additionally or alternatively, the first cure condition may comprise, or require, a different type of curing energy than the second cure condition for a desired cure to be achieved for the respective material. Additionally or alternatively, the first cure condition may comprise, or require, a different wavelength of curing energy than the second cure condition for a desired cure to be achieved for the respective material.

Accordingly, in examples of multi-part filaments 10 in which the first material 18 and the second material 20 are configured to be cured according to different cure conditions, a curing energy may be selectively applied to a multi-part filament 10 such that the curing energy only cures one of the first material 18 and the second material 20 or that cures the first material and the second material at different rates. Such a curing energy may be applied when forming a multi-part filament 10, such as to arrive at the desired rigidity characteristics of one or both of the first material 18 and the second material 20, such as discussed herein. Additionally or alternatively, such a curing energy may be applied to a multi-part filament 10 during the process of additively manufacturing a part with the multi-part filament 10 for various purposes, including, for example, to arrive at the desired rigidity characteristics of one or both of the first material 18 and the second material 20 as the multi-part filament is being dispensed for additively manufacturing a part in three dimensions without a substrate against which the multi-part filament 10 is laterally supported.

In some examples of multi-part filaments 10 in which both the first material 18 and the second material 20 are curable materials, the first material 18 may have a first extent of cure, and the second material 20 may have a second extent of cure that is greater than or less than the first extent of cure. In other words, in such examples, the first material 18 and the second material 20 may initially have distinct levels of cure. As a result, the first material 18 and the second material 20 may have distinct rigidity characteristics, with at least one having the desired rigidity characteristics for additively manufacturing a part in three dimensions without a substrate against which the multi-part filament 10 is laterally supported, for example.

In some such examples, one of the first material 18 and the second material 20 may be uncured, and the other of the first material 18 and the second material 20 may be partially cured. In such an example, the partially cured material may provide the desired rigidity characteristics for additively manufacturing a part in three dimensions without a substrate against which the multi-part filament 10 is laterally supported.

As schematically and optionally represented in FIG. 1, in some examples of multi-part filament 10, the first body part 14 further comprises elongate fibers 24 within a matrix of the first material 18. In such examples, the first body part 14 may be described as a fiber-reinforced composite material. Similarly, as also schematically and optionally represented in FIG. 1, the second body part 16 may further comprise elongate fibers 26 within a matrix of the second material 20, and in such examples, the second body part 16 may be described as a fiber-reinforced composite material. In examples that include both fibers 24 and fibers 26, fibers 24 and fibers 26 may be the same, or of the same material or configuration, or may be different, or of a different material or configuration, depending on the application for which the multi-part filament 10 is to be used. As illustrative, non-exclusive examples, fibers 24 and fibers 26 may comprise one or more of carbon fibers, glass fibers, aramid fibers, boron fibers, silicon-carbide fibers, ceramic fibers, optical fibers, fiber bundles, fiber weaves, fiber braids, wires, metal wires, conductive wire, and wire bundles.

An illustrative, non-exclusive example of a multi-part filament 10 has a first body part 14 that comprises a glass-fiber reinforced UV-curable resin and a second body part 16 that comprises a carbon fiber reinforced thermally-curable resin.

With continued reference to FIG. 1 and as optionally represented by dash-dot lines, in some examples of multi-part filaments 10, the elongate filament body 12 may further comprise a third body part 28 that extends longitudinally along the elongate filament body 12 and that comprises a third material 30 that is different from the first material 18 and the second material 20. When present, the third material 30 may be any suitable material depending on a desired application. The third material 30 may have any of the various optional properties discussed herein with respect to the first material 18 and the second material 20. Additionally or alternatively, the third material 30 may be selected for various applications, such as to define an electrical pathway in the form of a conductive wire, for example, such as to define an optical pathway in the form of an optical fiber or fiber bundle, or such as to provide a pathway for curing energy to be delivered to the second material 20. Additionally or alternatively, the third material 30 may comprise or be comprised by one or more of a sensor, circuitry, a hollow tube, a foam, and a magnetic material. For example, a foam may be selected as third material 30 to ultimately define a strong and lightweight multi-part filament 10.

As also schematically and optionally represented in FIG. 1 by dash-dot lines, in some examples of multi-part filament 10, the elongate filament body 12 may define an internal void 32 that extends longitudinally along the elongate filament body 12. In FIG. 1, the internal void 32 is schematically represented as being bound by the second body part 16; however, the internal void 32 alternatively may be bound by the first body part 14 or collectively by both the first body part 14 and the second body part 16. When present, the internal void 32 may serve various purposes depending on the application of a multi-part filament 10. For example, the internal void 32 may be used for fluid flow, such as when the multi-part filament 10 is used to construct a heat exchanger or to deliver a curing energy or mechanism to one or both of the first material 18 or the second material 20, such as in the example of a moisture curable material being used. Additionally or alternatively, the internal void may be configured to provide a desired hoop strength associated with a multi-part filament 10. Additionally or alternatively, the internal void 32 may be used to house such components as a sensor, wiring, or circuitry of a part manufactured from the multi-part filament 10. Other applications for internal void 32 are within the scope of the present disclosure.

The elongate filament body 12 of a multi-part filament 10 may take any suitable shape in cross-sectional profile, such as depending on the application for the multi-part filament 10, with FIGS. 2-19 schematically representing example shapes that may be used. For example, the shape of an elongate filament body 12 may be selected to stack or interlock with itself as it is being dispensed during an additive manufacturing process. Additionally or alternatively, the shape of an elongate filament body 12 may be selected to result in desired physical properties, such as strength and/or stiffness properties, of the multi-part filament 10 when used to additively manufacture a part.

As illustrative, non-exclusive examples, the elongate filament body 12 may have a cross-sectional profile that is circular, non-circular, polygonal, triangular, a quadrilateral, a rhombus, trapezoidal, plus-shaped, I- or H-shaped, symmetrical, radially symmetrical, symmetrical about one axis, symmetrical about two axes, asymmetrical, regular, and/or irregular. When describing a shape herein, it should be understood that the shape need not be a perfect shape to fall within the described shape. For example, the examples of FIGS. 8-13 may be described as having rectangular shapes, or square in the examples of FIGS. 11-13, even though the corners may be rounded, such as in the representation of FIGS. 9-10. The same may be said with respect to the trapezoidal shape of FIG. 14 and the triangular shape of FIG. 15. Additionally or alternatively, such shapes may be described as being "generally" the respective shape.

In some examples, the first body part 14 has the same shape in cross-section as the second body part 16, with FIGS. 2, 3, 6, 8, 9, and 11-19 illustrating such examples. In other examples, the first body part 14 has a different shape in cross-section than the second body part 16, with FIGS. 4, 5, 7, and 10 illustrating such examples. The shape of first body part 14 and/or second body part 16 may be selected for any suitable reason, such as depending on desired characteristics of and ultimate applications for a multi-part filament 10.

Figure 18:
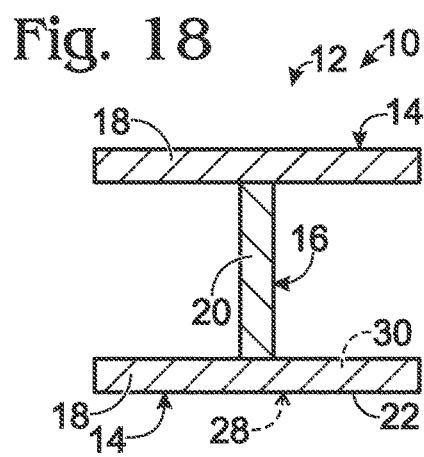
FIG. 18 is a cross-sectional view of another example of a multi-part filament for additive manufacturing.
Figure 19:
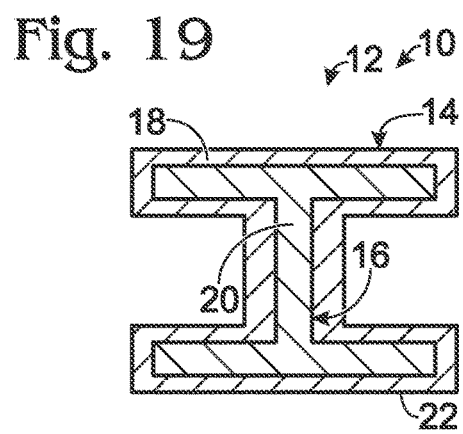
FIG. 19 is a cross-sectional view of another example of a multi-part filament for additive manufacturing.

In the examples of FIGS. 11 and 18, the first body part 14 may be described as having two spaced-apart portions with the second body part 16 being positioned between the two spaced-apart portions. Alternatively and as optionally indicated with dashed lead lines in FIGS. 11 and 18, in such examples, the elongate filament body 12 may be described as having a third body part 28 comprised of a third material 30, in which the third material 30 may be the same or different from the first material 18 and/or the second material 20.

In the examples of FIGS. 6, 7, 10, and 13, a third body part 28 is included. In some such examples, the first material 18 and the second material 20 may be the same material, but in different states of cure, such that one of the first body part 14 and the second body part 16 is more rigid than the other of the first body part 14 and the second body part 16. Additionally or alternatively, one of the first body part 14 and the second body part 16 may be cured or partially cured as the multi-part filament 10 is dispensed during an additive manufacturing process, and the other of the first body part 14 and the second body part 16 may be cured or partially cured subsequently, such as when an adjacent layer of the multi-part filament 10 is dispensed against a preceding layer.

Examples of additive manufacturing systems and methods that may facilitate such curing of a multi-part filament are disclosed in U.S. patent application Ser. No. 15/356,420, the disclosure of which is incorporated herein by reference. As illustrative, non-exclusive examples of the multi-part filaments of FIGS. 6, 7, 10, and 13, the first material 18 and the second material 20 may be a glass-fiber reinforced UV-curable resin, and the third material 30 may be a carbon-fiber reinforced thermally-curable resin.

Turning now to FIG. 20, example systems 50 for additively manufacturing parts are schematically represented. Some systems 50 comprise a supply 52 of a multi-part filament 10 and a delivery guide 54 that is positioned to receive the multi-part filament 10 from the supply 52 and that is configured to dispense the multi-part filament 10 to additively manufacture the part 56. In some such systems 50, the supply 52 of multi-part filament 10 may form the multi-part filament 10 as the system 50 manufactures a part 56. In some such systems 50, one of the first body part 14 and the second body part 16 may be pre-cured, or partially cured, prior to being joined with the other of the first body part 14 and the second body part 16 to form the multi-part filament 10. In other such systems 50, the supply 52 of multi-part filament 10 may simply house the multi-part filament 10 in a preformed condition. The delivery guide 54 additionally or alternatively may be described as a nozzle for dispensing the multi-part filament 10.

Alternatively and as schematically and optionally represented in FIG. 20 with dashed lead lines, other systems 50 comprise a supply 58 of the second body part 16 and a supply 60 of the first body part 14 positioned relative to the supply 58, with the supply 60 being configured to apply the first body part 14 to the second body part 16 to form the multi-part filament 10 as the system 50 manufactures a part 56. In some such examples, the first body part 14 may be applied to the second body part 16 upstream of the delivery guide 54, as schematically and optionally represented in FIG. 16, for example, by spraying, coating, misting, dripping, or otherwise applying the first body part 14 to the second body part 16. In other such examples, the first body part 14 may be applied to the second body part 16 within the delivery guide 54, as also schematically and optionally represented in FIG. 16, for example, by injecting the first body part 14 into the delivery guide 16 wherein it is applied to the second body part 16. Additionally or alternatively, the first body part 14 and the second body part 16 may be fused together to form the multi-part filament 10 as the system 50 manufactures a part 56.

As schematically and optionally represented in FIG. 20, some systems 50 further comprise a drive assembly 62 that is operatively coupled to the delivery guide 54 and that is configured to selectively move the delivery guide 54 in three dimensions to additively manufacture the part 56. As illustrative, non-exclusive examples, the drive assembly 62 may comprise one or more of a robotic arm and a print head drive assembly that facilitates movement of the delivery guide 54 in multiple degrees of freedom. In some examples, the drive assembly 62 may be configured to move the delivery guide 54 orthogonally in three dimensions. In some examples, the drive assembly 62 may be configured to move the delivery guide 54 in three dimensions with at least three degrees of freedom, with at least six degrees of freedom, with at least nine degrees of freedom, or with at least twelve degrees of freedom. Such examples permit for complex three-dimensional parts 56 to be manufactured, including parts 56 that are printed with the multi-part filament 10 being self-supported such that the multi-part filament 10 is dispensed in three dimensions without a substrate against which the multi-part filament 10 is laterally supported, as represented in FIG. 20.

As also schematically and optionally represented in FIG. 20, some systems 50 further comprise a curing energy source 64 configured to deliver curing energy 66 to the first body part 14, the second body part 16, or the multi-part filament 10 as the multi-part filament 10 is being dispensed from the delivery guide 54. Accordingly, when present, the curing energy source 64 may deliver curing energy 66 to impart desired characteristics, such as rigidity characteristics, to one or both of the first body part 14 or the second body part 16. Additionally or alternatively, the curing energy source 64 may deliver curing energy 66 to actively cure the part 56 as it is being additively manufactured. As schematically and optionally represented in FIG. 20, depending on the configuration of system 50, the curing energy source 64 may deliver the curing energy 66 to the multi-part filament 10 upstream of (i.e., before entering) the delivery guide 54, to the multi-part filament 10 within the delivery guide 54, to the multi-part filament 10 downstream of (i.e., after exiting) the delivery guide 54, to the first body part 14 or to the second body part 16 upstream of (i.e., before entering) the delivery guide 54. Other configurations also are within the scope of systems 50.

Figure 21:
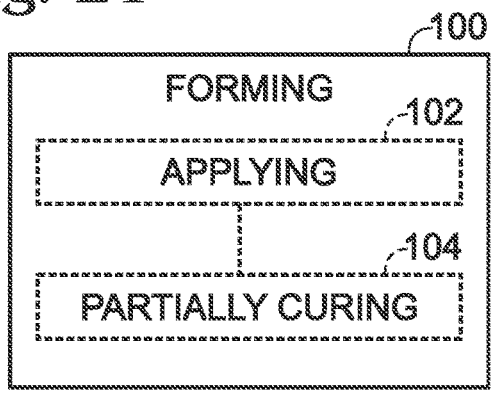
FIG. 21 is a flowchart schematically representing methods of forming multi-part filaments for additive manufacturing.

Turning now to FIG. 21, example methods 100 for forming a multi-part filament 10 are schematically represented. Some methods 100 comprise applying 102 the first body part 14 to the second body part 16. For example, in some such methods, the applying 102 may comprise one or more of spraying, coating, misting, and dripping the first body part 14 on the second body part 16. Some methods 100 comprise partially curing 104 one of the first material 18 and the second material 20, such as to impart desired cure properties, such as desired rigidity characteristics, as discussed herein.

Figure 22:
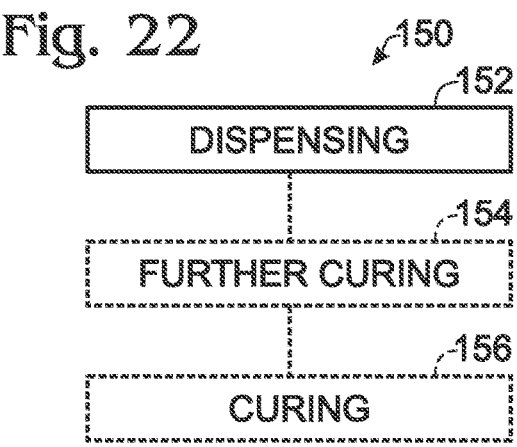
FIG. 22 is a flowchart schematically representing methods of additively manufacturing a part from multi-part filaments.

Turning now to FIG. 22, example methods 150 of additively manufacturing a part are schematically represented. Methods 150 comprise dispensing 152 a multi-part filament 10 in three dimensions to additively manufacture the part. In some such methods 150, the dispensing 152 comprises dispensing the multi-part filament 10 without a substrate against which the multi-part filament 10 is laterally supported. Some methods 150 further comprise concurrently with the dispensing 152, further curing 154 one of the first material 18 and the second material 20, such as in examples of multi-part filament 10 in which one of the first material 18 and the second material 20 is partially cured. Some such methods 150 further comprise curing 156 the other one of the first material 18 and the second material 20. For example, while the partially cured material is further cured, the uncured material may be initially and optionally fully cured.

Multi-part filaments 10, systems 50, methods 100, and methods 150 may further include, have, or otherwise be associated with, any other various components, aspects, configurations, characteristics, properties, steps, etc. for additively manufacturing parts. Illustrative, non-exclusive examples of such various optional components, aspects, configurations, characteristics, properties, steps, etc. are disclosed in U.S. patent application Ser. Nos. 14/841,423; 14/841,470; 14/920,748; 14/931,573; 14/995,507; 15/063,400; 15/345,189; 15/346,537; 15/356,420, and 15/367,021, the disclosures of which are incorporated herein by reference.

Illustrative, non-exclusive examples of inventive subject matter according to the present disclosure are described in the following enumerated paragraphs:

A. A multi-part filament for additive manufacturing, the multi-part filament comprising:
an elongate filament body, comprising:
a first body part extending longitudinally along the elongate filament body and comprising a first material; and
a second body part extending longitudinally along the elongate filament body and comprising a second material.

A1. The multi-part filament of paragraph A, wherein one of the first body part and the second body part is more rigid than the other of the first body part and the second body part.

A2. The multi-part filament of any of paragraphs A-A1, wherein the one of the first body part and the second body part is sufficiently rigid to print self-supporting structures from the multi-part filament.

A3. The multi-part filament of any of paragraphs A-A2, wherein one of the first body part and the second body part has a flexural rigidity of at least $10^{-9}$ Nm$^2$.

A3.1. The multi-part filament of paragraph A3, wherein the other of the first body part and the second body has a flexural rigidity less than $10^{-9}$ Nm$^2$.

A4. The multi-part filament of any of paragraphs A-A3.1, wherein the first material is a first curable material.

A4.1. The multi-part filament of paragraph A4, wherein the second material is a non-curable material.

A5. The multi-part filament of any of paragraphs A-A4, wherein the second material is a second curable material.

A5.1. The multi-part filament of paragraph A5 exclusive of paragraph A4, wherein the first material is a non-curable material.

A6. The multi-part filament of paragraph A5 when depending from paragraph A4, wherein the second curable material is different from the first curable material.

A7. The multi-part filament of any of paragraphs A5 and A6 when depending from paragraph A4, wherein the first curable material is configured to be cured responsive to a first cure condition, wherein the second curable material is configured to be cured responsive to a second cure condition, and wherein the second cure condition is different from the first cure condition.

A7.1. The multi-part filament of paragraph A7, wherein the first cure condition comprises one or more of:
a higher dose of curing energy or a lower dose of curing energy than the second cure condition;
a higher dose rate of curing energy or a lower dose rate of curing energy than the second cure condition;
a higher temperature or a lower temperature than the second cure condition;
a higher moisture or a lower moisture than the second cure condition;
a different type of curing energy than the second cure condition; and
a different wavelength of curing energy than the second cure condition.

A7.2. The multi-part filament of any of paragraphs A7-A7.1, wherein the first cure condition comprises one of heat, ultraviolet light, visible light, infrared light, x-rays, electron beams, and microwaves, and wherein the second cure condition comprises another one of heat, ultraviolet light, visible light, infrared light, x-rays, electron beams, and microwaves.

A8. The multi-part filament of any of paragraphs A5 and A6-A7.2 when depending from paragraph A4, wherein the first curable material has a first extent of cure, wherein the second curable material has a second extent of cure, and wherein the second extent of cure is greater than or less than the first extent of cure.

A9. The multi-part filament of any of paragraphs A5 and A6-A8 when depending from paragraph A4, wherein one of the first curable material and the second curable material is uncured, and wherein the other of the first curable material and the second curable material is partially cured.

A10. The multi-part filament of any of paragraphs A-A9, wherein the first body part further comprises elongate fibers within a matrix of the first material.

A11. The multi-part filament of any of paragraphs A-A10, wherein the second body part further comprises elongate fibers within a matrix of the second material.

A11.1. The multi-part filament of paragraph A11 when depending from paragraph A10, wherein the elongate fibers of the second body part are different from the elongate fibers of the first body part.

A12. The multi-part filament of any of paragraphs A-A11.1, wherein only the first body part defines an external surface of the elongate filament body.

A13. The multi-part filament of any of paragraphs A-A12, wherein the first body part surrounds the second body part.

A14. The multi-part filament of any of paragraphs A-A13, wherein the first body part and the second body part are coaxial.

A15. The multi-part filament of any of paragraphs A-A11.1, wherein the first body part and the second body part define an external surface of the elongate filament body.

A16. The multi-part filament of any of paragraphs A-A15, wherein the elongate filament body has a cross-sectional profile that is (optionally generally) circular, non-circular, polygonal, triangular, a quadrilateral, a rhombus, trapezoidal, plus-shaped, I- or H-shaped, symmetrical, radially symmetrical, symmetrical about one axis, symmetrical about two axes, asymmetrical, regular, and/or irregular.

A17. The multi-part filament of any of paragraphs A-A16, wherein in cross-section, the first body part has (optionally generally) the same shape as the second body part.

A18. The multi-part filament of any of paragraphs A-A16, wherein in cross-section, the first body part has a different shape than the second body part.

A19. The multi-part filament of any of paragraphs A-A18, wherein the elongate filament body further comprises a third body part extending longitudinally along the elongate filament body and comprising a third material that is different from the first material and the second material.

A20. The multi-part filament of any of paragraphs A-A19, wherein the elongate filament body defines an internal void extending longitudinally along the elongate filament body.

A20.1. The multi-part filament of paragraph A20, wherein the internal void is bound by the first body part.

A20.2. The multi-part filament of paragraph A20, wherein the internal void is bound by the second body part.

A20.3. The multi-part filament of paragraph A20, wherein the internal void is collectively bound by the first body part and the second body part.

A21. The use of the multi-part filament of any of paragraphs A-A20.3 to additively manufacture a part.

A22. A method, comprising:
forming the multi-part filament of any of paragraphs A-A20.3.

A22.1. The method of paragraph A22, wherein the forming comprises applying the first body part to the second body part.

A22.1.1. The method of paragraph A22.1, wherein the applying comprises one or more of spraying, coating, misting, and dripping the first body part on the second body part.

A22.2. The method of any of paragraphs A22-A22.1.1, wherein the forming comprises partially curing one of the first material and the second material.

A23. A method of additively manufacturing a part, the method comprising:
dispensing the multi-part filament of any of paragraphs A-A20.3 in three dimensions to additively manufacture the part.

A23.1. The method of paragraph A23, wherein the dispensing comprises dispensing the multi-part filament without a substrate against which the multi-part filament is laterally supported.

A23.2. The method of any of paragraphs A23-A23.1, further comprising:
concurrently with the dispensing, further curing one of the first material and the second material.

A23.2.1. The method of paragraph A23.2, further comprising:
concurrently with the dispensing, curing the other one of the first material and the second material.

A24. A system for additively manufacturing a part, the system comprising:
a supply of the multi-part filament of any of paragraphs A-A20.3; and
a delivery guide positioned to receive the multi-part filament from the supply and configured to dispense the multi-part filament to additively manufacture the part.

A25. A system for additively manufacturing a part from the multi-part filament of any of paragraphs A-A20.3, the system comprising:
a supply of the second body part;
a supply of the first body part positioned relative to the supply of the second body part and configured to apply the first body part to the second body part to form the multi-part filament; and
a delivery guide positioned relative to the supply of the second body part and the supply of the first body part and configured to dispense the multi-part filament to additively manufacture the part.

A26. The system of any of paragraphs A24-A25, further comprising:
a drive assembly operatively coupled to the delivery guide and configured to selectively move the delivery guide in three dimensions to additively manufacture the part.

A27. The system of any of paragraphs A24-A26, further comprising:
a curing energy source configured to deliver curing energy to the first body part, the second body part, or the multi-part filament as the multi-part filament is being dispensed from the delivery guide.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A system for additively manufacturing a part, the system comprising:
    a supply of a first body part comprising a first curable polymer material that is configured to be cured responsive to a first cure condition;
    a supply of a second body part comprising a second curable polymer material that is configured to be cured responsive to a second cure condition that is different from the first cure condition;
    a delivery guide positioned relative to the supply of the second body part and the supply of the first body part and configured to dispense the first body part and the second body part as a multi-part filament having an elongate filament body to additively manufacture the part such that the first body part and the second body part extend longitudinally along the elongate filament body; and
    a curing energy source configured to deliver curing energy corresponding to the first cure condition to the first body part and to not deliver curing energy corresponding to the second cure condition to the second body part as the multi-part filament is being dispensed from the delivery guide to impart a desired rigidity characteristic to the first body part to facilitate printing of self-supporting structures from the multi-part filament.

2. The system of claim 1, wherein the second curable polymer material is different from the first curable polymer material.

3. The system of claim 1, wherein the first cure condition comprises one or more of:
    a higher dose of curing energy or a lower dose of curing energy than the second cure condition;
    a higher dose rate of curing energy or a lower dose rate of curing energy than the second cure condition;
    a higher temperature or a lower temperature than the second cure condition;
    a higher moisture or a lower moisture than the second cure condition;
    a different type of curing energy than the second cure condition; and
    a different wavelength of curing energy than the second cure condition.

4. The system of claim 1, wherein the first cure condition comprises one of heat, ultraviolet light, visible light, infrared light, x-rays, electron beams, and microwaves, and wherein the second cure condition comprises another one of heat, ultraviolet light, visible light, infrared light, x-rays, electron beams, and microwaves.

5. The system of claim 1, wherein the delivery guide is configured to dispense the multi-part filament such that only the first body part defines an external surface of the elongate filament body.

6. The system of claim 1, wherein the delivery guide is configured to dispense the multi-part filament such that the first body part and the second body part are coaxial.

7. The system of claim 1, wherein the delivery guide is configured to dispense the multi-part filament such that the first body part and the second body part define an external surface of the elongate filament body.

8. The system of claim 1, further comprising a supply of a third body part, wherein the delivery guide is configured to dispense the third body part with the first body part and the second body part as the multi-part filament such that the third body part extends longitudinally along the elongate filament body, and wherein the third body part comprises a third material that is different from the first curable polymer material and the second curable polymer material.

9. The system of claim 1, wherein the delivery guide is configured to dispense the multi-part filament such that the elongate filament body defines an internal void extending longitudinally along the elongate filament body.

10. The system of claim 1, wherein the first body comprises a glass-fiber reinforced UV-curable resin, and wherein the second body part comprises a carbon-fiber reinforced thermally-curable resin.

11. The system of claim 1, wherein the curing energy source is configured to deliver curing energy corresponding to the first cure condition to the first body part such that the first body part results in having a flexural rigidity of least $10^{-9}$ Nm$^2$, and wherein the second body part has a flexural rigidity less than $10^{-9}$ Nm$^2$.

12. The system of claim 1,
    wherein the first curable polymer material is a UV-curable polymer material; and
    wherein the curing energy source is configured to deliver UV light to the first body part as the multi-part filament is being dispensed from the delivery guide to impart the desired rigidity characteristic to the first body part.

13. The system of claim 1, wherein the elongate filament body has a cross-sectional profile that is circular.

14. The system of claim 1, wherein the elongate filament body has a cross-sectional profile that is non-circular.

15. The system of claim 1, wherein the elongate filament body has a cross-sectional profile that is polygonal.

16. The system of claim 1, wherein the elongate filament body has a cross-sectional profile that is a quadrilateral.

17. The system of claim 1, wherein the first body part further comprises first-body-part elongate fibers within a matrix of the first curable polymer material, and wherein the second body part further comprises second-body-part elongate fibers within a matrix of the second curable polymer material.

18. The system of claim 5, wherein the first-body-part elongate fibers are different from the second-body-part elongate fibers.

* * * * *

UNITED STATES PATENT AND TRADEMARK OFFICE
CERTIFICATE OF CORRECTION

PATENT NO. : 10,576,683 B2
APPLICATION NO. : 15/407197
DATED : March 3, 2020
INVENTOR(S) : Michael Patrick Kozar, Mark Stewart Wilenski and Samuel F. Harrison Page 1 of 1

It is certified that error appears in the above-identified patent and that said Letters Patent is hereby corrected as shown below:

In the Claims

Claim 11, Column 14, Line 35, insert --at-- after "of" and before "least".

Claim 18, Column 14, Line 59, replace "5" with --17--.

Signed and Sealed this
Eighteenth Day of August, 2020

Andrei Iancu
*Director of the United States Patent and Trademark Office*